(No Model.)  2 Sheets—Sheet 1.
C. GOULD.
PROCESS OF MAKING VINEGAR.
No. 375,621.  Patented Dec. 27, 1887.
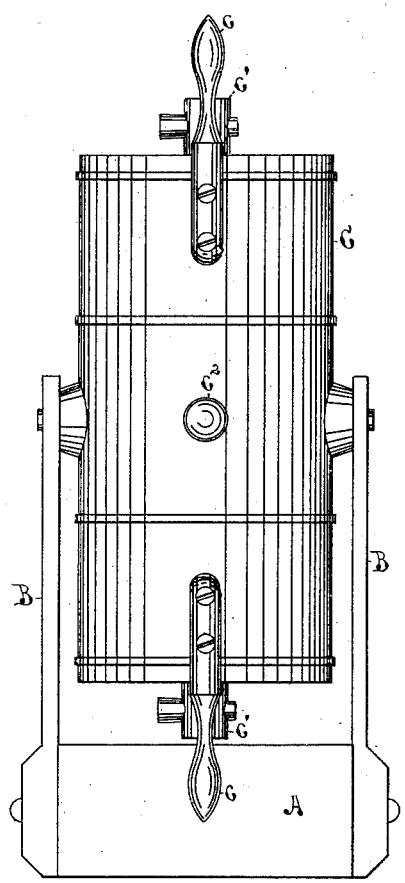
Witnesses
Wm. S. Brown
David Hall Rice
Inventor
Charles Gould (No Model.) 2 Sheets—Sheet 2.
C. GOULD.
PROCESS OF MAKING VINEGAR.
No. 375,621. Patented Dec. 27, 1887.
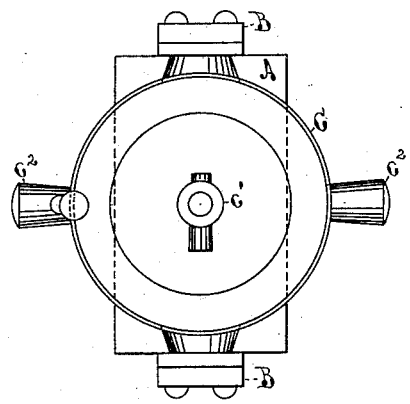
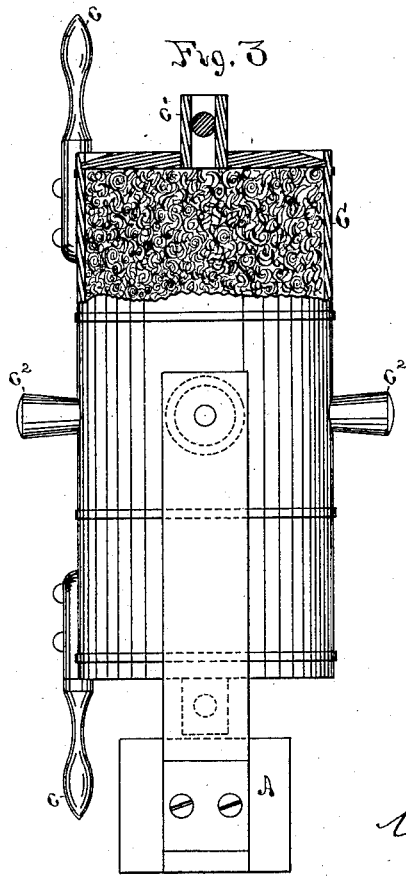
Witnesses
Wm. S. Brown
David Hall Rice
Inventor
Charles Gould

UNITED STATES PATENT OFFICE.

CHARLES GOULD, OF LOWELL, MASSACHUSETTS.

PROCESS OF MAKING VINEGAR.

SPECIFICATION forming part of Letters Patent No. 375,621, dated December 27, 1887.

Application filed October 18, 1886. Serial No. 216,487. (No model.)

*To all whom it may concern:*

Be it known that I, CHARLES GOULD, of Lowell, in the county of Middlesex and State of Massachusetts, have invented a new and Improved Process and Apparatus for Acidifying Fruit-Juices, of which the following is a specification.

My invention relates to the acidifying of fruit and other juices; and it consists in a new and useful process for promoting said acidification, and in certain improvements in the apparatus for effecting the same, substantially as hereinafter described and claimed.

In the drawings, Figure 1 is a side elevation of the apparatus for conducting the acidifying process. Fig. 2 is a top plan view of the same. Fig. 3 is a side elevation of the same, taken at right angles to that of Fig. 1, partly in section, to show its internal arrangement.

My process depends, primarily, upon the discovery that a considerable and valuable portion of the acids produced during the acidification of fruit-juices rises from the latter in the form of gas, and unless caught and confined escapes into the atmosphere and is lost, and that such gases may be caught in a proper receptacle as they so rise, and be confined and recondensed and the acids contained therein restored to and reincorporated with the liquid from which they escaped, and the acid properties of the latter greatly increased. The process of acidification is also greatly expedited by my method.

In conducting the said process of confining the said acid gases as they escape and condensing and reincorporating their acid constituents with the liquid juices, as stated, a variety of apparatus may be employed. I will, however, describe one which I have found efficient in use and the method of using the same.

A is a base-piece, formed of wood or other suitable material.

B B are uprights secured at their lower ends to the base-piece and having holes transversely and in line with each other to receive the trunnions of the cask C. The cask is mounted by these trunnions between the uprights B B, so as to be capable of swinging freely thereon. It is provided with handles $c$ $c$ at each end to aid in swinging or oscillating it upon the trunnions, and with stop-cocks $c'$ $c'$ at each end, of ordinary construction. It also has holes through each side, into which plugs $c^2$ $c^2$ are fitted tightly. The cask C is to be filled loosely with some material—such as shavings of wood—for the purpose hereinafter described.

The apparatus having been thus prepared, I carry out my process with it as follows: I fill the cask C up to within a short distance below the plugs $c^2$ $c^2$ with fresh fruit-juice—as, for instance, sweet cider. I then remove the plugs $c^2$ $c^2$, being careful to have the stop-cock $c'$ at the upper end of the cask air and gas tight and to keep it closed. I then leave the cask to stand, say, twenty-four to thirty-six hours, more or less, in this position, according as the acetification is proceeding more or less rapidly. The gases rising from the juice will during this time ascend into the part of the cask C above the plugs $c^2$ and gradually expel the air through the plug-holes remaining confined in the upper part of the cask. These gases carry with them certain constituents of the juice, which, coming into contact in the gaseous form with the air, acidify very rapidly and remain in that condition. After a proper time has elapsed to fill the upper part of cask C with these acid gases, I insert the plugs $c^2$ $c^2$ tightly in their holes, and by means of the handles $c$ $c$ revolve the cask on its trunnions to a horizontal position and oscillate it for ten to fifteen minutes or more with considerable rapidity, so as to throw the liquid into all parts of the cask. This brings the liquid into contact with the confined acid gases in the cask in the form of small streams and drops spurted through the interstices of the shavings with which the cask is filled, and the gases are thereby recondensed into the liquid and the acid constituents thereof reabsorbed or taken up by it. When the vibration of the cask on its trunnions has been continued long enough to condense all the gases, it is again swung with one of its ends uppermost, and the stop-cock $c'$ on top of the cask is opened for two or three minutes, when the air will rush inward through the stop-cock to fill the partial vacuum caused by the condensation of the acid gases, as described. The rapidity with which the air rushes into this cock will determine whether the condensation of the acid gases has been complete, as if so the suction of air through the cock will be quite audible. After the air has been admitted through the upper cock, $c'$, as described, it is closed and the plugs $c^2$ $c^2$ removed, and the cask left to accumulate a fresh supply of acid gases, when the condensation of them and reabsorption of their acid constituents is accomplished as before.

Not only does this process result in a more speedy acidification of the liquid and a greater percentage of acetic acid in it, (often amounting to twenty per cent. of the total acid to a given quantity,) but it is unnecessary to clean the shavings in the cask when my process is used. I attribute this to the fact that the strength of the acid in the liquid during the process is so kept up from time to time that it dissolves the gummy constituents of the solids, which would cause them to adhere to the shavings, and I find that the vinegar produced is richer in these solid constituents. All of the solids not so dissolved are discharged freely from the cask when the vinegar is finally drawn off, and the shavings within it are left in better condition to aid the acidification of another quantity of fruit-juice than if it had been necessary to wash them. The mounting of the cask on trunnions greatly facilitates the condensation process, as above described.

I do not confine the application of my process to the natural juices expressed from fruit, as it may be used with good effect upon the artificial mixtures or juices of a similar chemical nature which are used in the manufacture of vinegar.

I do not in this application make any claim upon the apparatus herein shown for acidifying fruit-juices, as I am about to file an application for a patent for the same.

What I claim as new and of my invention is—

The described process of acidifying fruit and other juices, which consists in receiving and confining the acid gases in a suitable receptacle as they rise from the liquid and condensing and reincorporating the acid constituents of said gases into said liquid from time to time as the acidification progresses, substantially as described.

CHARLES GOULD.

Witnesses:
DAVID HALL RICE,
N. P. OCKINGTON.